UNITED STATES PATENT OFFICE 3,444,239
Patented May 13, 1969

3,444,239
(p-PHENYLENEBIS(METHYLENETHIO))
DIALANINE COMPOUNDS
Carleton W. Roberts, Midland, Mich., assignor to The
Dow Chemical Company, Midland, Mich., a corporation of Delaware
No Drawing. Filed June 22, 1966, Ser. No. 559,385
Int. Cl. C07c *149/42*
U.S. Cl. 260—470            5 Claims

ABSTRACT OF THE DISCLOSURE

The present invention is directed to a (p-phenylenebis (methylenethio))dialanine compound of the formula:

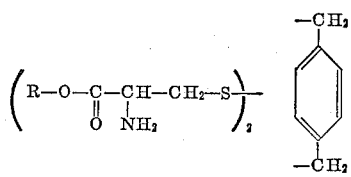

and its hydrohalide addition salts. In the formula, R represents hydrogen or lower alkyl of from 1 to 4, both inclusive, carbon atoms, and the term "hydrohalide" designates hydrobromide hydrochloride. and hydriodide. The products are crystalline solid materials useful as herbicides to control the growth of plant organisms and as substrates in the practices of vapor phase chromatography.

---

The present invention is directed to a (p-phenylenebis (methylenethio))dialanine compound of the formula:

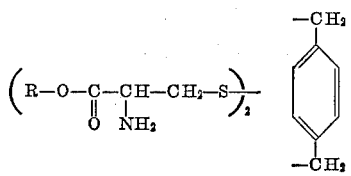

and its hydrohalide addition salt. In the above and succeeding formulae, R represents hydrogen or loweralkyl. In the present specification and claims, the term "loweralkyl" is employed to designate alkyl radicals being of from 1 to 4, both inclusive, carbon atoms, and the term "hydrohalide," to designate hydrobromide, hydrochloride, and hydriodide, only. The products of this invention are crystalline solid materials, typically existing as finely divided powders. They are generally useful as herbicides to control the growth of plant organisms; in particular, they are useful as agents to control the growth of bacteria and fungi, including *Aspergillus terreus* and *Candida pelliculosa*. They are also useful as substrates in the practices of vapor phase chromatography.

Those products of the present invention wherein R represents hydrogen are prepared by the reaction of cysteine:

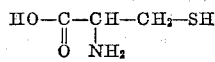

with para-phenylenedimethylene dibromide:

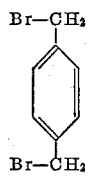

in the presence of a sodium salt, typically sodium bicarbonate. The cysteine may be employed, at least initially, in the form of its hydrohalide addition salt. The reaction is conveniently and preferably carried out in water as a reaction medium. The reaction consumes the reacting materials in amounts which represent two molecular proportions of cysteine and one molecular proportion of the para-phenylenedimethylene dibromide, and the use of the reactants in such amounts is preferred. The amount of sodium bicarbonate or other sodium salt employed is not critical; however, higher yields of the desired product are obtained when the reaction medium is maintained during the course of the reaction at a pH of about 7–9; accordingly, it is preferred that the sodium bicarbonate, or other sodium salt, be employed in an amount sufficient to maintain the reaction mixture at a pH of about 7–9. The reaction goes forward readily under temperatures of a wide range with the preparation in the reaction mixture of the desired product wherein R represents hydrogen and of sodium salt, water, and carbon dioxide as byproducts. Generally, however, it is preferred to conduct the reaction at temperatures of from —10° C. to 100° C., or, yet more preferred, at temperatures of from 0° C. to 85° C.

The products of the present invention wherein R represents hydrogen are of moderate solubility in organic solvents and of low solubility in water; accordingly, such products typically precipitate in the aqueous reaction mixture or become a separate liquid phase. Separation from the reaction mixture, as well as from the byproduct sodium salt soluble therein, is readily achieved by filtration or by decantation. Higher yields are obtained if, prior to separation, the reaction mixture is acidified to a pH of about 3 to 5, conveniently by addition of an amount of acetic acid. The separated product can be employed directly for the useful purposes of the present invention, or, if desired, can be purified before being so employed. The reaction normally results in the preparation of a small amount of cystine, which has the following formula:

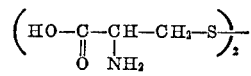

This substance is essentially insoluble in water and therefore precipitates with the desired product. If it is desired to separate cystine, such separation is conveniently achieved in procedures which comprise the suspension of the precipitated product material in water with ammonium hydroxide, the addition to the resulting aqueous suspension of sufficient potassium cyanide to convert the cystine to cysteine, reprecipitation of the product with acid, and separation by filtration. In addition, the product can also be purified in more conventional procedures, notably by washing with water.

Upon analysis, it has been found that the products of the present invention wherein R represents hydrogen and wherein the nitrogen does not participate in a hydrohalide addition salt ordinarily exist in an ionized form:

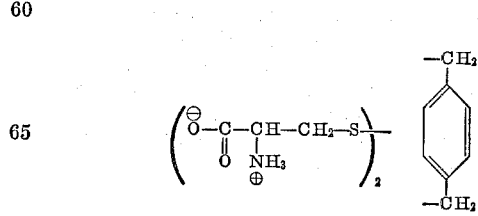

such form being known generally as a Zwitterion.

The hydrohalide addition salts of those products wherein R represents hydrogen, which salts are of the following formula:

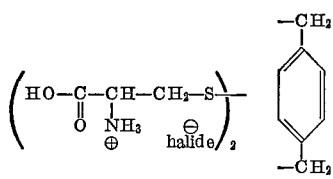

are prepared in conventional procedures from the corresponding products typically existing, as set forth above, in the Zwitterion form. In such procedures, the corresponding product is reacted with a hydrohalic acid, that is, hydrobromic acid, hydrochloric acid, or hydriodic acid. The reaction consumes the reactants in amounts representing equimolecular proportions, and the use of the reactants in such amounts is preferred. The reaction is carried out in the presence of an inert liquid reaction medium; typically, the reactants are mixed in a loweralkanol, and diethyl ether then added in an amount sufficient to precipitate the desired hydrohalide addition salt. The salt is then separated by filtration, and, if desired, purified by conventional procedures.

Those products of the present invention wherein R represents loweralkyl are prepared by reacting the corresponding product wherein R represents hydrogen with a lower-alkanol of the formula H—O-loweralkyl. The reaction is carried out in accordance with those procedures generally employed in Fischer type esterification reactions. In the instance of the preparation of products of the present invention by this route, it is generally preferred to employ a ten to twenty fold excess of the loweralkanol reactant and sufficient hydrogen chloride gas to saturate the solution. The reaction goes forward under temperatures of a wide range, such as from $-10°$ C. to $100°$ C. However, in the preparation of the present products, it has been found preferable to heat the reaction mixture to the reflux temperature of the loweralkanol and maintain the reaction mixture thereat for a period of time; to thereafter cool the reaction mixture to about $0°$ C. and resaturate with hydrogen chloride; and to then repeat the process. The reaction results in the preparation of the desired product, as the hydrohalide addition salt, in the reaction mixture. Water is produced as byproduct, and there frequently remains in the reaction mixture a small amount of the acid.

The products wherein R represents loweralkyl are generally very soluble in water and the loweralkanols; hence, such products are conveniently separated by evaporation of the reaction medium under subatmospheric pressure. The resulting separated product can be purified in conventional procedures, most typically by redispersing the product in a quantity of the loweralkanol concerned and redistilling the resulting dispersion to separate the purified product.

The products of the present invention are subject to optical isomerism. The cysteine which serves as a starting material for the products is itself available in either form or as a racemic mixture. Inasmuch as none of the subsequent reactions to prepare the products of the present invention effects the isomerism, products having either form, as well as products representing a racemic mixture, can be prepared in accordance with the foregoing teaching. All such products, regardless of form, are useful for the purposes taught for the present invention.

When it is desired to employ those products wherein R represents loweralkyl in the free amine form, the corresponding hydrohalide addition salts are reacted in conventional procedures with sodium hydroxide. The reaction is carried out in the presence of an inert liquid reaction medium and consumes the reactants in amounts representing equimolecular proportions. Preferably, the reaction is carried out by dissolving the corresponding hydrohalide addition salt in water, adding diethyl ether to obtain a two-phase system, adding the sodium hydroxide, and then shaking the resulting mixture. Thereafter, the diethyl ether solution is decanted and the diethyl ether removed by evaporation under subatmospheric pressure to separate the free amine product. The product thus obtained can be purified by conventional procedures.

The following examples illustrates the present invention and will enable those skilled in the art to practice the same.

Example 1.—3,3'-(p-phenylenebis(methylenethio)) dialanine

To a solution of L-cysteine hydrochloride monohydrate (8.9 grams; 0.0508 mole) in 36 milliliters of water, the solution being under nitrogen and at a temperature of about $0°$ C., was added 80 milliliters of a saturated solution of sodium bicarbonate. The resulting mixture had a pH of 7. p-phenylenedimethylene dibromide (6.7 grams; 0.0254 mole) and ethanol (100 milliliters) were added. Thereafter, an additional 20 milliliters of aqueous saturated solution of sodium bicarbonate were added to the reaction mixture to give a pH of about 9. The reaction mixture was heated, during the addition of the additional sodium bicarbonate, to reflux temperature of about $82°$ C.; during this period, portions of the desired 3,3'-(p-phenylenebis(methylenethio))dialanine product precipitated in the reaction mixture. Reflux was continued overnight; thereafter, the reaction mixture was permitted to cool to a temperature of about $0°$ C. During the cooling, glacial acetic acid was added to obtain a final pH of about 3. The resulting mixture was filtered to separate the product, the separated product washed with water, and the washed product suspended in an additional amount of water at a temperature of about $0°$ C. The suspension was carried out under nitrogen with concentrated ammonium hydroxide being added in an amount to obtain a clear solution. Potassium cyanide (1.37 grams) was then added to the solution and the solution stirred for one hour. The product was reprecipitated by portion-wise addition of glacial acetic acid to a pH of 4. The resulting precipitated product was separated by filtration, washed with water, and dried by evaporation under subatmospheric pressure at a temperature of $70°$ C. for about 16 hours. The product thus obtained melted, with decomposition, at 236–$238°$ C. Elemental analysis was conducted and the following results obtained:

Calculated: C, 48.53; H, 6.40; N, 8.09; S, 18.51. Found: C, 48.85; H, 5.80; N, 7.79; S, 18.17.

Example 2.—Diethyl 3,3'-(p-phenylenebis (methylenethio))dialanine dihydrochloride

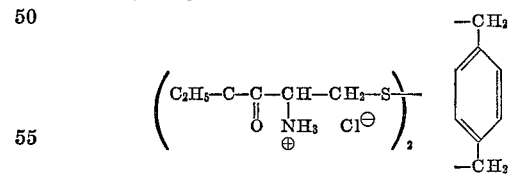

3,3' - (p - phenylenebis(methylenethio))dialanine (30.0 grams; 0.0865 mole) and 700 milliliters of ethanol were mixed. Dry gaseous hydrogen chloride was bubbled into the resulting mixture over a period of 5.5 hours and with cooling to a temperature of about $0°$ C. Thereafter, the reaction mixture was heated to reflux temperature and maintained thereat for a period of about 15 hours. An additional 1100 milliliters of ethanol were added and the reaction mixture chilled to a temperature of about $0°$ C., while additional dry gaseous hydrogen chloride was bubbled in over a period of seven hours. As a matter of convenience, the mixture was held at room temperature over the weekend. The mixture was then again heated to reflux and held thereat for a period of about 56 hours. Excess ethanol and hydrochloric acid were then removed by evaporation under subatmospheric pressure to obtain the desired diethyl 3,3' - (p - phenylenebis(methylthio)) dialanine dihydrochloride product as a residue. The product residue was mixed with a 250 milliliter portion of fresh ethanol and the ethanol removed by evaporation under subatmospheric pressure. This process was repeated. The product was then dried in a vacuum oven. The product has a molecular weight of 400.6.

In view of the foregoing teaching and examples, those skilled in the art will be enabled to prepare all of the other products of the present invention. Representative such products include the following: dimethyl 3,3'-(p-phenylenebis(methylenethio))dialanine, molecular weight of 372.5; diisopropyl 3,3' - (p - phenylenebis(methylenethio))dialanine dihydrobromide, molecular weight of 590.5; di-n-butyl 3,3' - (p - phenylenebis(methylenethio)) dialanine dihydrochloride, melting point, 172–176° C.; di-sec-butyl 3,3' - (p - phenylenebis(methylenethio))dialanine, molecular weight of 456.7; and 3,3'-(p-phenlyenebis(methylenethio))dialanine dihydriodide, molecular weight of 600.3.

The products of the present invention, as above noted, are useful as agents to control the growth of plants. In such applications, the unmodified products can be employed; however, it is generally preferred that the product or products be employed in the form of a composition comprising the product or products and one or more adjuvants, such as surface-active agents, inert finely-divided solids, water or organic solvents, and the like. In representative operations, there was prepared an aqueous spray formulation comprising 4,000 parts of 3,3'-(p-phenylenebis(methylenethio))dialanine per million parts by weight of ultimate formulation; this spray formulation was applied, to the point of run-off, to stands of young thriving bean plants. The plants were then permitted to dry and held under good agricultural conditions for a period of about two weeks. Other stands of bean plants were left untreated, to serve as a control, and similarly held under the same good agricultural conditions for the same period of time. Observations at the end of the two-week period showed a complete kill of the bean plants in the treated stands, whereas the bean plants in the control stands appeared in all respects to be healthy and thriving.

Also as noted previously, the products of the present invention are useful in vapor phase chromatography. In such application, one or more of the products is taken up in solution in a solvent, and the solvent solution intimately and thoroughly mixed and stirred with an amount of chemically cleaned diatomaceous earth representing from about twenty to about four times the weight of the product or products of the present invention; solvent is removed by vaporization to obtain a treated infusorial earth uniformly coated with and bearing a deposit of the product or products. With repulverization if necessary, the treated infusorial earth is then filled under suction and with the aid of sonic vibration into a coiled otherwise empty column for use in vapor phase chromatography at temperatures at which the product or products of the present invention are mechanically stable. The chromatographic separations upon such column, with the product or products of the present invention functioning as substrate, are useful in research procedures.

I claim:
1. Compound of the formula

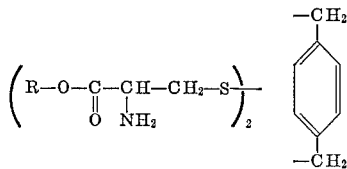

wherein R represents hydrogen or loweralkyl of from 1 to 4 carbon atoms, inclusive, or a hydrohalide addition salt thereof, wherein the hydrohalide is hydrochloride, hydrobromide or hydriodide.

2. The composition of matter claimed in claim 1 wherein R represents hydrogen, namely 3,3'-(p-phenylene-bis(methylenethio))dialanine or a hydrohalide addition salt thereof wherein the hydrohalide is hydrochloride, hydrobromide or hydriodide.

3. The composition of matter claimed in claim 1 wherein R represents loweralkyl of from 1 to 4 carbon atoms, namely, compound of the formula:

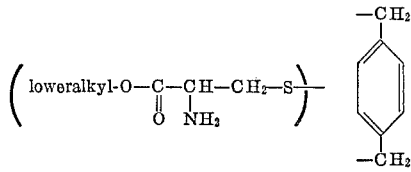

or hydrohalide addition salt thereof wherein the hydrohalide is hydrochloride, hydrobromide or hydriodide.

4. The composition of matter claimed in claim 3 wherein loweralkyl represents ethyl and hydrohalide designates hydrochloride, namely diethyl 3,3'-(p-phenylenebis(methylenethio))dialanine dihydrochloride.

5. The composition of matter claimed in claim 3 wherein loweralkyl represents n-butyl and hydrohalide designates hydrochloride, namely di-n-butyl 3,3'-(p-phenylenebis(methylenethio))dialanine dihydrochloride.

References Cited

UNITED STATES PATENTS 3,330,855   7/1967   Braus et al. _____ 260—470

JAMES A. PATTEN, Primary Examiner.

E. GLEIMAN, Assistant Examiner.

U.S. Cl. X.R.

71—98; 252—408; 260—501.11, 516, 534; 424—286, 300.